(12) United States Patent
Nishikibe et al.

(10) Patent No.: US 10,326,400 B2
(45) Date of Patent: Jun. 18, 2019

(54) OVERCURRENT PROTECTION DEVICE AND DRIVE DEVICE HAVING OVERCURRENT PROTECTION DEVICE

(71) Applicant: AISIN SEIKI KABUSHIKI KAISHA, Kariya-shi (JP)

(72) Inventors: Takeshi Nishikibe, Tokai (JP); Ryo Asano, Kariya (JP); Taishi Iikawa, Okazaki (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/935,790

(22) Filed: Mar. 26, 2018

(65) Prior Publication Data

US 2018/0287546 A1    Oct. 4, 2018

(30) Foreign Application Priority Data

Mar. 29, 2017  (JP) ................................ 2017-065588

(51) Int. Cl.
| | | |
|---|---|---|
| H02M 3/155 | (2006.01) | |
| H02P 29/024 | (2016.01) | |
| H02P 3/18 | (2006.01) | |
| H02P 29/032 | (2016.01) | |
| H02H 3/093 | (2006.01) | |
| H02H 7/085 | (2006.01) | |
| H02P 6/00 | (2016.01) | |

(52) U.S. Cl.
CPC .......... *H02P 29/027* (2013.01); *H02H 3/093* (2013.01); *H02H 7/085* (2013.01); *H02P 3/18* (2013.01); *H02P 29/032* (2016.02)

(58) Field of Classification Search
USPC .................................................. 318/430–434
See application file for complete search history.

(56) References Cited

U.S. PATENT DOCUMENTS

| | | | |
|---|---|---|---|
| 3,796,918 A | 3/1974 | DeForest et al. | |
| 4,967,304 A | 10/1990 | Dougherty | |
| 7,355,826 B2 | 4/2008 | Ochiai et al. | |
| 8,860,353 B1 | 10/2014 | Weber et al. | |
| 9,673,743 B1 * | 6/2017 | Billson | H02P 23/26 |

(Continued)

FOREIGN PATENT DOCUMENTS

| | | |
|---|---|---|
| JP | 2006-50886 | 2/2006 |
| JP | 2007-239281 | 9/2007 |
| JP | 2016-82806 | 5/2016 |

OTHER PUBLICATIONS

Extended European Search Report dated Aug. 31, 2018 in Patent Application No. 18165091.2, citing documents AA, AB, and AC therein, 9 pages.

*Primary Examiner* — Bentsu Ro
(74) *Attorney, Agent, or Firm* — Oblon, McClelland, Maier & Neustadt, L.L.P.

(57) ABSTRACT

An overcurrent protection device has a threshold value for determination of a magnitude of motor current and performs: a first detection of detecting a period, during which the motor current takes a value larger than the threshold value, as a first value; a second detection of detecting a maximum value of the motor current as a second value by frequently detecting the motor current; and a signal formation of forming a motor stop signal based on determination using the first value and the second value.

10 Claims, 2 Drawing Sheets

(56) References Cited

U.S. PATENT DOCUMENTS

| | | | |
|---|---|---|---|
| 2004/0080333 A1* | 4/2004 | Klein | G01K 7/183 |
| | | | 374/185 |
| 2008/0278870 A1* | 11/2008 | Deng | H02H 7/0838 |
| | | | 361/31 |
| 2011/0110002 A1* | 5/2011 | Ooshima | H02P 7/29 |
| | | | 361/33 |
| 2013/0286514 A1* | 10/2013 | Oguchi | B60L 3/003 |
| | | | 361/31 |
| 2016/0111868 A1 | 4/2016 | Kawata et al. | |

* cited by examiner

OVERCURRENT PROTECTION DEVICE AND DRIVE DEVICE HAVING OVERCURRENT PROTECTION DEVICE

CROSS REFERENCE TO RELATED APPLICATIONS

This application is based on and claims priority under 35 U.S.C. § 119 to Japanese Patent Application 2017-065588, filed on Mar. 29, 2017, the entire contents of which are incorporated herein by reference.

TECHNICAL FIELD

This disclosure relates to an overcurrent protection device and a drive device having the overcurrent protection device.

BACKGROUND DISCUSSION

As an overcurrent protection device, a technique described in JP 2016-082806 A (Reference 1) is known.

The overcurrent protection device described in Reference 1 is provided in a switching circuit, which forms an output voltage. The overcurrent protection device includes a voltage monitoring unit and a current monitoring unit. The voltage monitoring unit monitors a voltage formed by the output stage of the switching circuit. The current monitoring unit monitors current flowing through the output stage of the switching circuit.

By the way, in the technique described in Reference 1, the overcurrent protection device stops a switching operation when the voltage of the output stage exceeds a threshold value. In addition, the overcurrent protection device stops a switching operation when the voltage of the output stage is lower than a threshold value and overcurrent exceeds a threshold value. That is, when the voltage of the output stage is lower than the threshold value, it is determined whether or not the current is overcurrent according to whether or not the current exceeds the threshold value.

In a drive device that drives, for example, a motor, a voltage input to a switching circuit varies. Meanwhile, overcurrent in the motor also varies depending on the magnitude of the applied voltage. Therefore, in a case where the voltage varies, when determining overcurrent based on a current reference as to whether or not current exceeds a threshold value, there is a risk of erroneously determining overcurrent even if this determination is performed under a condition that the voltage is lower than a predetermined threshold value. Due to this, there is a risk of unnecessarily stopping the switching circuit, and in some cases, protection of the motor may not be appropriate.

SUMMARY

An overcurrent protection device according to an aspect of this disclosure has a threshold value for determination of a magnitude of motor current, and performs a first detection of detecting a period, during which the motor current takes a value larger than the threshold value, as a first value, a second detection of detecting a maximum value of the motor current as a second value by frequently detecting the motor current, and a signal formation of forming a motor stop signal based on determination using the first value and the second value.

A drive device according to an aspect of this disclosure includes the overcurrent protection device described in any of the above paragraphs.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An overcurrent protection device will be described with reference to FIGS. 1 to 4.

Figure 1:
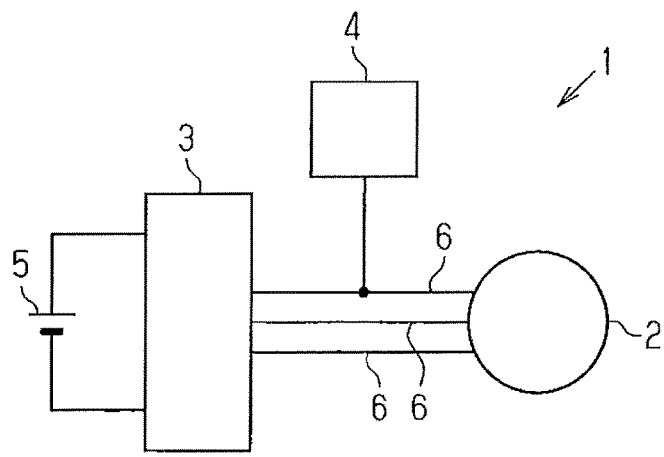
FIG. 1 is a schematic diagram of a drive device.

The outline of a drive device 1 including an overcurrent protection device 4 will be described with reference to FIG. 1.

The drive device 1 operates, for example, a movable unit in a vehicle. For example, the movable unit is a window of a vehicle door, a vehicle door, a sunshade, a drive shaft of an engine, or the like.

The drive device 1 includes a motor 2, a motor drive circuit 3, which drives the motor 2, and an overcurrent protection device 4. A power supply 5 is connected to the drive device 1. The motor drive circuit 3 is, for example, an inverter circuit. For example, the motor drive circuit 3 and the motor 2 are connected by three power lines 6.

The overcurrent protection device 4 detects motor current CM flowing through the motor 2 of the drive device 1. The overcurrent protection device 4 detects, for example, the amplitude of a current value flowing through the power line 6 for a unit time as "motor current CM". In addition, in the present embodiment, the overcurrent protection device 4 detects the motor current CM at one of the three power lines 6, but may detect the motor current CM for each of the three power lines 6.

The overcurrent protection device 4 includes a first threshold value THA, a second threshold value THB, and a determination value THx for comparison with the motor current CM. The first threshold value THA and the second threshold value THB are values for determining the magnitude of the motor current CM.

The first threshold value THA indicates the lower limit of the current value (hereinafter referred to as "monitoring current value") that needs to be monitored. When the current continues to flow through the motor 2 for a long time in a state where the motor current CM is large, the motor 2 may be deteriorated. The monitoring current value described above indicates a current value that may deteriorate the motor when the current continues to flow through the motor 2 for a long time. The first threshold value THA is a value for determining whether or not the motor current CM is at the monitoring current value.

The second threshold value THB is lower than the first threshold value THA. The second threshold value THB indicates the upper limit value of a safe current value. The safe current value indicates the magnitude of current that may continue to flow through the motor 2 for a long time.

The range between the first threshold value THA and the second threshold value THB is the range between the upper limit value of the safe current value and the lower limit value of the monitoring current value, and is the range at the intermediate level with respect to the necessity of monitoring an energization time. In addition, hereinafter, the range larger than the second threshold value THB and equal to or less than the first threshold value THA is referred to as an "intermediate range".

The first threshold value THA, the second threshold value THB, and the determination value THx are stored in a storage device of the overcurrent protection device 4. In addition, the first threshold value THA and the second threshold value THB may be configured as the reference voltage of a comparator of the overcurrent protection device 4.

The overcurrent protection device 4 performs a first detection, a second detection, a reset processing, a determination value correction processing, a determination processing, and a signal formation at a predetermined cycle based on the motor current CM.

In the first detection, the overcurrent protection device 4 detects the length of a period, during which the motor current CM takes a value larger than the first threshold value THA, as a first value Na. Specifically, in the first detection, when the motor current CM is higher than the first threshold value THA, the overcurrent protection device 4 stores the period, during which the motor current CM is higher than the first threshold value THA, as the first value Na. In addition, when there are a plurality of periods during which the motor current CM is higher than the first threshold value THA in a period during which a state where the motor current CM is higher than the second threshold value THB is continued, the overcurrent protection device 4 stores the sum of the periods as the first value Na. Thus, the first value Na increases as the length of the period during which the motor current CM is higher than the first threshold value THA increases.

In the second detection, the overcurrent protection device 4 sequentially detects the motor current CM, and sets the motor current CM at that time when the motor current CM takes the maximum value to a second value Nb (see "second value updating processing" to be described later).

In the reset processing, the first value Na, the second value Nb, and the determination value THx are reset based on the fact that the motor current CM becomes equal to or less than the second threshold value THB. For example, the first value Na and the second value Nb are reset to a predetermined value (e.g., "0"). The determination value THx is reset to an initial value THi. The overcurrent protection device 4 does not update and also does not reset the first value Na or the second value Nb for a period during which the motor current CM is in the intermediate range (the range within which the motor current CM is higher than the second threshold THB and equal to or less than the first threshold THA). That is, when the motor current CM is in the intermediate range, the first value Na and the second value Nb are maintained.

In the determination value correction processing, the overcurrent protection device 4 corrects the determination value THx.

The determination value THx is a value for determining whether or not the first value Na is not excessively increased. The determination result that the first value Na is higher than the determination value THx indicates that a period during which the motor current CM is a monitoring current value is long and that motor protection is required.

The determination value THx is sequentially corrected. Specifically, the overcurrent protection device 4 subtracts a preset correction value CA from the determination value THx whenever the second value Nb is updated in a case where the motor current CM is higher than the first threshold value THA, and sets the obtained value to a new determination value THx. Thus, the determination value THx decreases as the second value Nb increases.

The reason why the determination value THx is corrected whenever the second value Nb is updated is that the peak of the motor current CM may accelerate the deterioration of the motor 2. That is, even when the period during which the motor current CM is higher than the first threshold value THA is short, there is a risk of the motor 2 being deteriorated when the maximum value of the motor current CM is very large. Therefore, the peak may be detected as an overcurrent state. For this reason, the determination value THx is corrected so as to become smaller whenever the maximum value of the motor current CM is updated in a case where the motor current CM is higher than the first threshold value THA.

In the determination processing, the overcurrent protection device 4 determines whether or not the first value Na is higher than the determination value THx. Then, the overcurrent protection device 4 executes the following signal formation when it is determined that the first value Na is higher than the determination value THx, and does not execute the signal formation when there is the other determination result.

The signal formation forms a motor stop signal for stopping the motor 2 based on a determination result that the first value Na is higher than the determination value THx. The motor stop signal is transmitted to the motor drive circuit 3. The motor drive circuit 3 stops an operation based on the reception of the motor stop signal, and cuts off the current flowing to the motor 2.

The overcurrent protection device 4 may include a counter computing unit. The overcurrent protection device 4 calculates the first value Na as a count value using the counter computing unit. For example, the counter computing unit counts the length of the period during which the motor current CM takes a value larger than the first threshold value THA. The overcurrent protection device 4 stores the count value output from the counter computing unit as the first value Na. In this case, the first value Na becomes a discrete value, and is updated with an operation cycle of the counter computing unit.

In addition, the overcurrent protection device 4 detects the second value Nb by an analog circuit, and converts the detected voltage value into a digital value. In this case, the second value Nb is updated with an operation cycle of the analog circuit. In addition, FIG. 2 to be described later is a chart of an example in which the first value Na is detected by the counter computing unit and the second value Nb is detected by the analog circuit. Since the operation cycle of the analog circuit is shorter than the operation cycle of the counter computing unit, in FIG. 2 to be described later, the chart of the second value Nb is continuously illustrated.

An operation of the overcurrent protection device 4 will be described with reference to FIG. 2.

Figure 2:
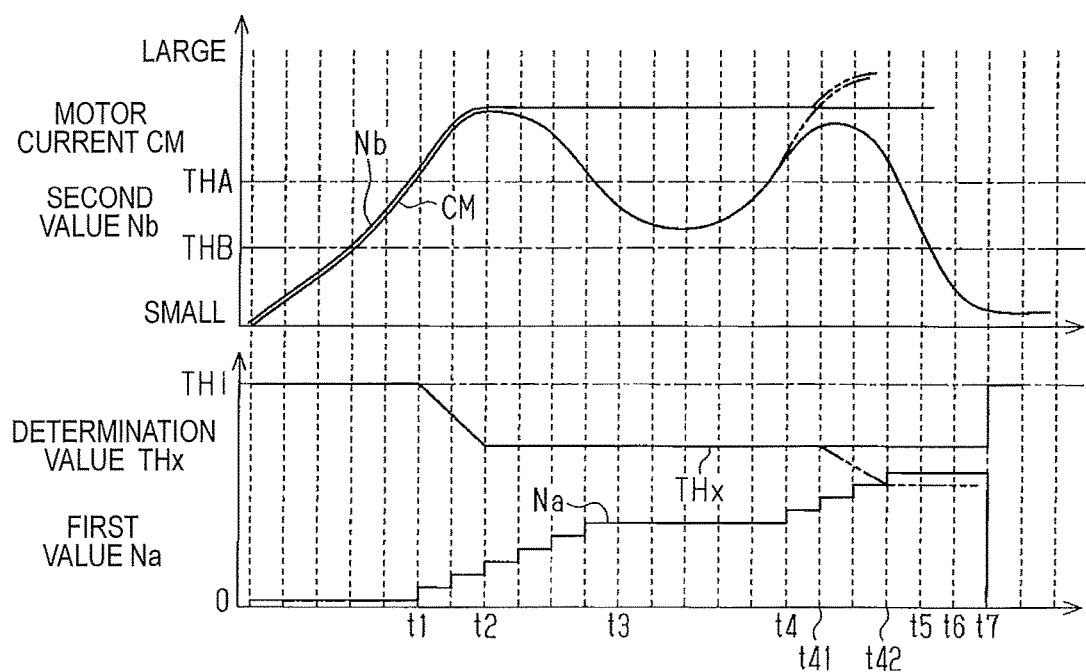
FIG. 2 is a timing chart of an overcurrent protection device.

The upper chart in FIG. 2 illustrates the variation of the motor current CM. In addition, the scale on the horizontal axis in FIG. 2 indicates a processing time point at which the magnitude of the motor current CM is determined. Hereinafter, the "time point" indicates the time point of this processing.

The motor current CM becomes higher than the first threshold value THA at time point t1, and reaches the maximum value at time point t2. Thereafter, the motor current CM decreases, and takes a value within the intermediate range at time point t3. At time point t4, the motor current CM again becomes a value larger than the first threshold value THA, takes a value within the intermediate range at time point t5, and becomes a value smaller than the second threshold value THB at time point t6.

In this example, the first value Na varies as follows.

The first value Na is initially set to 0. The first value Na successively increases by a constant value from the time point t1 at which the motor current CM becomes higher than the first threshold value THA to a time point immediately before time point t3 at which the motor current CM becomes equal to or less than the first threshold value THA. Thereafter, when the motor current CM takes a value within the intermediate range, that is, for a period between time point t3 and time point t4, the first value Na remains unchanged. Thereafter, from time point t4 at which the motor current CM becomes a value larger than the first threshold value THA to immediately before time point t5 at which the motor current CM becomes equal to or less than the first threshold value THA, the first value Na again successively increases by a constant value. Thereafter, the motor current CM takes a value equal to or less than the second threshold value THB at time point t6, and the motor current CM takes a value equal to or less than the second threshold value THB at the next time point t7, whereby the first value Na is reset to "0".

The second value Nb varies as follows.

The second value Nb is initially set to 0. Since the maximum value of the motor current CM continues to update when the motor current CM increases, the second value Nb increases as the motor current CM increases. The motor current CM becomes the maximum value at time point t2, and then decreases. On the other hand, the second value Nb remains unchanged at time point t2. Thereafter, the motor current CM takes a value in the intermediate range, but the second value Nb also remains in this period. In addition, since the motor current CM becomes higher than the first threshold value THA at time point t4, but thereafter does not exceed the maximum value of the motor current CM at time point t2, the second value Nb remains unchanged. Thereafter, the motor current CM takes a value equal to or less than the second threshold value THB at time point t6, and the motor current CM takes a value equal to or less than the second threshold value THB at the next time point t7, whereby the second value Nb is reset to In the example illustrated in FIG. 2, the determination value THx varies as follows.

From time point t1 at which the motor current CM becomes higher than the first threshold value THA, the determination value THx decreases by correction. Specifically, the second value Nb gradually increases from time point t1 to time point t2. Thus, the determination value THx gradually decreases from time point t1 to time point t2. Thereafter, since the second value Nb remains unchanged at time point t2, the determination value THx remains unchanged. In addition, at the time point at which the second value Nb is reset, the determination value THx is also reset, and the determination value THx returns to the initial value THi.

In the example (solid line) of the chart illustrated in FIG. 2, the first value Na is smaller than the determination value THx from the time point at which the first value Na is the initial value to the time point at which the first value Na is reset. Therefore, the motor stop signal is not formed and the motor 2 does not stop.

An example in which the motor stop signal is formed will be described with reference to a portion indicated by the two-dot chain line in the chart of FIG. 2.

The portion indicated by the two-dot chain line of the chart illustrates a state where the motor current CM abruptly increases at time point t4 at which the motor current CM secondly becomes higher than the first threshold value THA. In this example, the motor current CM exceeds the past maximum value (the maximum value at time point t2) at time point t41, and then continues to gradually increase until time point t42. In this case, the second value Nb gradually increases as the maximum value of the motor current CM is updated. Then, the determination value THx gradually decreases as the second value Nb increases. As a result, the first value Na becomes larger than the determination value THx at time point t42. At this time, the motor 2 stops since the motor stop signal is formed.

Figure 3:
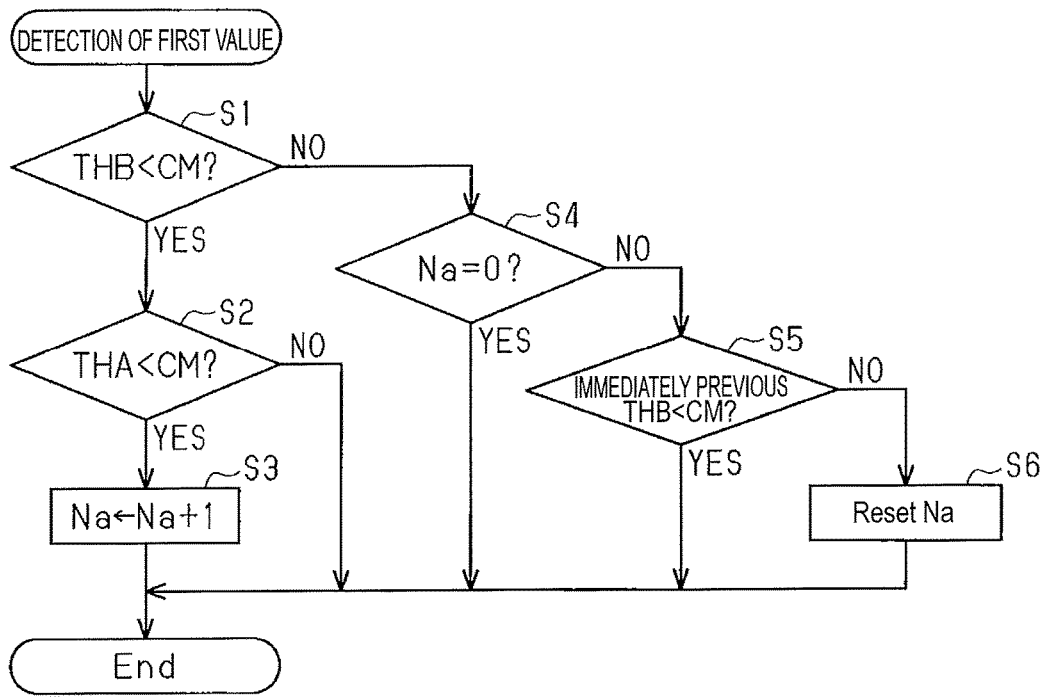
FIG. 3 is a flowchart illustrating detection of a first value.

An example of the detection of the first value Na will be described with reference to the flowchart of FIG. 3. In this example, the overcurrent protection device 4 detects the first value Na by using the counter computing unit. The first value Na increases by 1. The detection of the first value Na is periodically executed.

In step S1, the overcurrent protection device 4 determines whether or not the motor current CM is higher than the second threshold value THB. When the motor current CM is higher than the second threshold value THB (YES determination), the overcurrent protection device 4 performs a processing of step S2.

In step S2, the overcurrent protection device 4 determines whether or not the motor current CM is higher than the first threshold value THA. When the motor current CM is equal to or less than the first threshold value THA (NO determination), the first value Na is not updated and remains unchanged. When the motor current CM is higher than the first threshold value THA (YES determination), the overcurrent protection device 4 performs a processing of step S3.

In step S3, the overcurrent protection device 4 adds "1" to the first value Na immediately before updating, and sets the obtained value as a new first value Na. In this way, the first value Na increases according to the length of a period during which the motor current CM takes a value larger than the first threshold value THA.

In step S1, when it is determined that the motor current CM is equal to or less than the second threshold value THB, the overcurrent protection device 4 performs a processing of step S4.

In step S4, the overcurrent protection device 4 determines whether or not the first value Na at the time of the processing is "0" (i.e., initial value). When the first value Na is "0" (YES determination), the first value Na is not updated and remains unchanged. When the first value Na is not "0" (NO determination), the overcurrent protection device 4 performs a processing of step S5.

In step S5, the overcurrent protection device 4 determines whether or not the motor current CM is higher than the second threshold value THB immediately before the time of the processing (one time point ago). In this determination, when the overcurrent protection device 4 determines that the motor current CM is higher than the second threshold value THB (YES determination), the first value Na is not updated and remains unchanged. In this determination, when it is determined that the motor current CM is equal to or less than the second threshold THB (NO determination), the overcurrent protection device 4 resets the first value Na in step S6. Thus, the first value Na becomes "0".

According to the processings of step S4 to step S6, the first value Na is reset based on that the motor current CM becomes less than or equal to the second threshold value THB twice in succession. This prevents the first value Na from being reset based on a fact that the motor current CM temporarily becomes smaller than the second threshold value THB due to the influence of, for example, noise.

An example of detection of the second value Nb will be described.

The overcurrent protection device 4 detects the second value Nb by using an analog circuit. The overcurrent protection device 4 stores an initial value (e.g., "0") of the second value Nb. The overcurrent protection device 4 sequentially detects the motor current CM, and compares the second value Nb with the detected motor current CM. When the detected motor current CM is higher than the second value Nb, the overcurrent protection device 4 stores the detected motor current CM as a new second value Nb (hereinafter referred to as "second value updating processing"). Then, the overcurrent protection device 4 periodically executes the second value updating processing.

Figure 4:
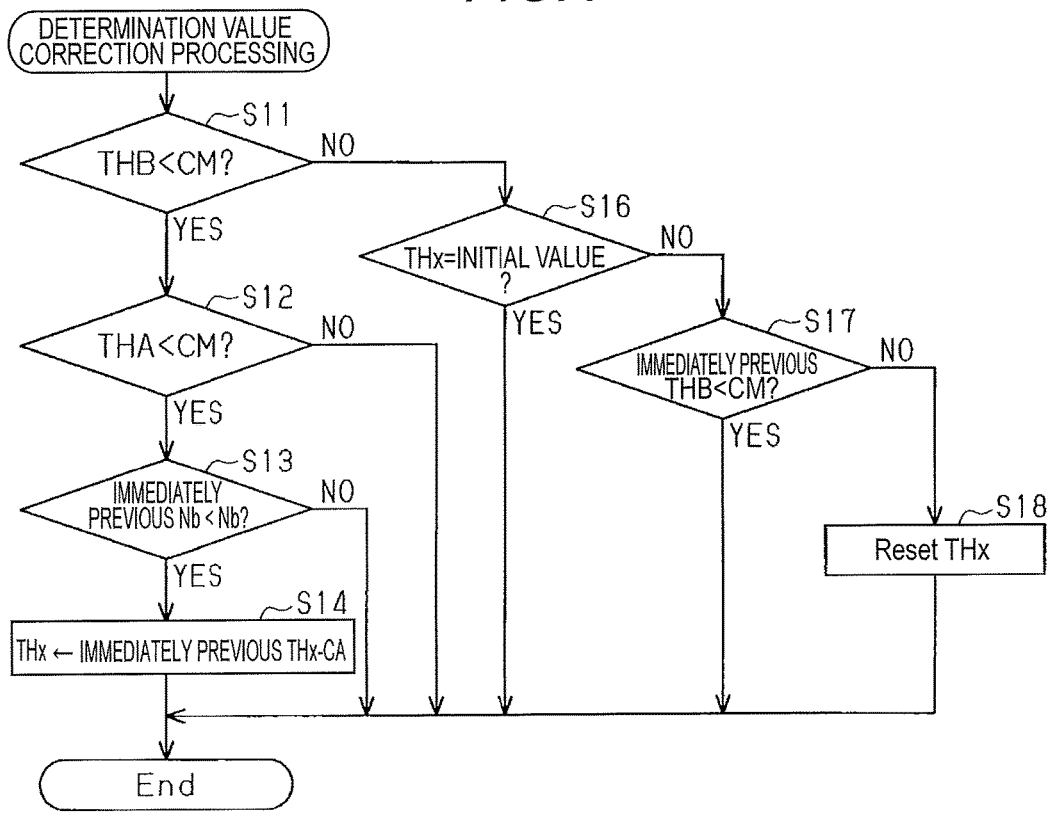
FIG. 4 is a flowchart illustrating a determination value correction processing.

An example of the determination value correction processing will be described with reference to the flowchart of FIG. 4.

In step S11, the overcurrent protection device 4 determines whether or not the motor current CM is higher than the second threshold value THB. When the motor current CM is higher than the second threshold value THB (YES determination), the overcurrent protection device 4 performs a processing of step S12.

In step S12, the overcurrent protection device 4 determines whether or not the motor current CM is higher than the first threshold value THA. When the motor current CM is equal to or less than the first threshold value THA (NO determination), the determination value THx is not updated and remains unchanged. When the motor current CM is higher than the first threshold value THA (YES determination), the overcurrent protection device 4 performs a processing of step S13.

In step S13, the overcurrent protection device 4 determines whether or not the second value Nb is larger than the preceding second value Nb. When the second value Nb is not larger than the preceding second value Nb (NO determination), the determination value THx is not updated and remains unchanged. When the second value Nb is larger than the preceding second value Nb (YES determination), that is, when it is determined the maximum value of the motor current CM is updated, the overcurrent protection device 4 performs a processing of step S14.

In step S14, the overcurrent protection device 4 corrects the determination value THx. Specifically, the overcurrent protection device 4 subtracts a preset correction value CA from the preceding determination value THx, and newly sets the obtained value to the determination value THx. In this way, the determination value THx is corrected whenever the maximum value of the motor current CM is updated.

In step S11, when it is determined that the motor current CM is equal to or less than the second threshold value THB, the overcurrent protection device 4 performs a processing of step S16.

In step S16, the overcurrent protection device 4 determines whether or not the determination value THx at the time of the processing is the initial value THi. When the determination value THx is the initial value THi (YES determination), the determination value THx is not updated and remains unchanged. When the determination value THx is not the initial value THi (NO determination), the overcurrent protection device 4 performs a processing of step S17.

In step S17, the overcurrent protection device 4 determines whether or not the motor current CM is higher than the second threshold value THB immediately before the time of the processing (one time point ago). In this determination, when it is determined that the motor current CM is higher than the second threshold value THB (YES determination), the overcurrent protection device 4 does not update the determination value THx and maintains the determination value THx. In this determination, when it is determined that the motor current CM is equal to or less than the second threshold value THB (NO determination), the overcurrent protection device 4 resets the determination value THx in step S18. As a result, the determination value THx returns to the initial value THi.

That is, according to the processings of steps S16 to S18, the determination value THx is reset based on the fact that the motor current CM becomes smaller than the second threshold value THB twice in succession. This prevents the determination value THx from being reset based on the fact that the motor current CM temporarily becomes smaller than the second threshold value THB due to the influence of, for example, noise.

An operation and effect of the overcurrent protection device 4 will be described.

(1) The overcurrent protection device 4 performs first detection of detecting the first value Na, second detection of detecting the second value Nb, and signal formation of forming a motor stop signal based on determination using the first value Na and the second value Nb. The first value Na indicates a period during which the motor current CM takes a value larger than the first threshold value THA. The second value Nb indicates the maximum value of the motor current CM, which is frequently detected.

According to this configuration, the overcurrent protection device 4 forms the motor stop signal based on the first value Na, which corresponds to the period during which the motor current CM takes a value larger than the first threshold value THA, and the second value Nb, which corresponds to the maximum value of the motor current CM. As a result, the maximum value of the motor current CM is reflected in the formation of the motor stop signal. As a result, the motor 2 is appropriately protected.

(2) In the signal formation, the overcurrent protection device 4 forms the motor stop signal when the first value Na is larger than the determination value THx. Thus, it is possible to prevent the motor 2 from continuing to drive in an overcurrent state.

(3) In the determination value correction processing, when the second value Nb is larger than the first threshold value THA, the overcurrent protection device 4 corrects the determination value THx so as to become smaller as the second value Nb increases. Therefore, since the determination value THx decreases as the maximum value of the motor current CM increases so that the upper limit value that the first value Na can take is suppressed to be low, the motor 2 may be appropriately protected. In addition, the determination value THx is corrected only when the motor current CM is higher than the first threshold value THA. That is, when the possibility that the motor 2 is in the overcurrent state is low, the determination value THx is not corrected. As a result, it is possible to prevent the motor 2 from unnecessarily stopping.

(4) The first value Na and the second value Nb are reset based on the fact that the motor current CM becomes equal to or less than the second threshold value THB.

According to this configuration, when there is no risk of the motor 2 reaching the overcurrent state, the first value Na and the second value Nb are reset so that the formation of the motor stop signal is prevented. Thus, it is possible to prevent the motor 2 from stopping unnecessarily. In addition, when the motor current CM is between the first threshold value THA and the second threshold value THB, the first value Na and the second value Nb each are not reset. As a result, a state where the motor current CM varies around the first threshold value THA, that is, a state where there is a possibility of the motor current CM reaching the overcurrent state (hereinafter referred to as "preliminary overcurrent state") may be continuously detected by a variable state where the first value Na and the second value Nb each are not reset. As a result, a situation in which the first value Na increases in the preliminary overcurrent state so that the motor 2 reaches the overcurrent state may be appropriately detected. In this way, the motor 2 may be adequately protected.

(5) The overcurrent protection device 4 detects the first value Na as the sum of periods during which the motor current CM is higher than the first threshold value THA, in a period during which a state where the motor current CM is higher than the second threshold value THB is continued.

The motor current CM may become higher than the first threshold value THA, or may become equal to or lower than the first threshold value THA. In a case of resetting the first value Na whenever the motor current CM becomes equal to or lower than the first threshold value THA, the first value Na is difficult to increase since the frequency of resetting becomes high when the cycle of change of the motor current CM is short. Then, even when the overcurrent state is determined by the average value of the motor current CM per unit time, there is a risk that the first value Na does not exceed the determination value THx.

In this respect, according to the above configuration, the period during which the motor current CM is higher than the second threshold value THB, i.e. the first value Na is detected as the sum of the periods during which the motor current CM is higher than the first threshold value THA. Therefore, when the motor current CM varies around the first threshold value THA, the first value Na gradually increases. In this way, the first value Na precisely reflects a transient state until the motor 2 reaches the overcurrent state. Therefore, the formation timing of the motor stop signal based on the first value Na is appropriately set depending on the overcurrent state of the motor 2. In this way, the motor 2 is appropriately protected.

(6) The drive device 1 includes the overcurrent protection device 4 described above. According to this configuration, the drive device 1 may appropriately protect the motor 2 because it includes the overcurrent protection device 4.

<Other Embodiments>

The overcurrent protection device 4 may be modified from the above embodiment as follows.

The second value Nb is equal to the maximum value of the motor current CM in the above embodiment, but may be defined as a value correlated with the maximum value of the motor current CM. For example, the second value Nb may be defined as a value obtained by adding "1" to the preceding second value Nb whenever the maximum value of the motor current CM is updated. Even with such a modification, since the timing at which the second value Nb increases may be detected, the determination value THx may be updated in the same manner as in the above-described steps S13 and S14. Therefore, the same effect as the above embodiment may be obtained.

The first value Na is computed by the counter computing unit in the above embodiment, but may be detected by an integrating circuit. In addition, the second value Nb is detected by the analog circuit, but may be calculated by the counter computing unit.

(1) An overcurrent protection device according to an aspect of this disclosure has a threshold value for determination of a magnitude of motor current, and performs a first detection of detecting a period, during which the motor current takes a value larger than the threshold value, as a first value, a second detection of detecting a maximum value of the motor current as a second value by frequently detecting the motor current, and a signal formation of forming a motor stop signal based on determination using the first value and the second value.

According to this configuration, the overcurrent protection device forms the motor stop signal based on not only the first value, which corresponds to the period during which the motor current takes a value larger than the threshold value, but also the second value, which corresponds to the maximum value of the motor current. As a result, the maximum value of the motor current is reflected in the formation of the motor stop signal. As a result, the motor is appropriately protected.

(2) In the overcurrent protection device, in the signal formation, the motor stop signal may be formed when the first value is greater larger than a determination value.

According to this configuration, since the motor stop signal is formed when the first value becomes larger than the determination value, it is possible to prevent the motor from continuing to drive in an overcurrent state.

(3) In the overcurrent protection device, the overcurrent protection device may further performs a determination value correction processing of correcting the determination value, and, in the determination value correction processing, the determination value may be corrected to become smaller as the second value increases when the motor current is a value larger than the threshold value.

According to this configuration, since the determination value decreases as the maximum value of the motor current increases and since the upper limit value that the first value can take is suppressed to be low, it is possible to appropriately protect the motor.

In addition, the determination value is corrected only when the motor current is higher than the threshold value. That is, the determination value is not corrected when the possibility that the motor is in the overcurrent state is low. As a result, it is possible to prevent the motor from stopping unnecessarily.

(4) The overcurrent protection device may have the threshold value as a first threshold value, and may further have a second threshold value lower than the first threshold value. The overcurrent protection device may reset the first value and the second value based on that the motor current becomes equal to or less than the second threshold value.

According to this configuration, when there is no risk of the motor becoming the overcurrent state, the first value and the second value are reset, and the formation of the motor stop signal is prevented. As a result, it is possible to prevent the motor from stopping unnecessarily. In addition, when the motor current is between the first threshold value and the second threshold value, the first value and the second value each are not reset. As a result, it is possible to continuously detect a state where the motor current varies around the first threshold value, that is, a state where there is a possibility of reaching the overcurrent state, by a variable state where the first value and the second each value are not reset. In this way, it is possible to appropriately protect the motor.

(5) The overcurrent protection device may detect the first value as a sum of periods, during which the motor current is higher than the first threshold value, in a period during which a state where the motor current is higher than the second threshold value is continued.

According to this configuration, when the motor current varies around the first threshold value, the first value gradually increases. Thus, the first value accurately reflects a transient state until the motor reaches the overcurrent state. Therefore, the formation timing of the motor stop signal based on the first value is appropriately set depending on the overcurrent state of the motor. In this way the motor is appropriately protected.

(6) A drive device according to an aspect of this disclosure includes the overcurrent protection device described in any of the above paragraphs. According to this configuration, the drive device can appropriately protect the motor because it includes the overcurrent protection device.

With the overcurrent protection device and the drive device, it is possible to appropriately protect the motor.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An overcurrent protection device,
wherein the overcurrent protection device has a threshold value for determination of a magnitude of motor current, and
the overcurrent protection device performs:
    a first detection of detecting a period, during which the motor current takes a value larger than the threshold value, as a first value;
    a second detection of detecting a maximum value of the motor current as a second value by frequently detecting the motor current; and
    a signal formation of forming a motor stop signal based on determination using the first value and the second value.

2. The device according to claim 1,
wherein, in the signal formation, the motor stop signal is formed when the first value is larger than a determination value.

3. The device according to claim 2,
wherein the overcurrent protection device further performs a determination value correction processing of correcting the determination value, and
in the determination value correction processing, the determination value is corrected to become smaller as the second value increases when the motor current is a value larger than the threshold value.

4. The device according to claim 1,
wherein the overcurrent protection device has the threshold value as a first threshold value, and further has a second threshold value lower than the first threshold value, and
the overcurrent protection device resets the first value and the second value based on a fact that the motor current becomes equal to or less than the second threshold value.

5. The device according to claim 4,
wherein the overcurrent protection device detects the first value as a sum of periods, during which the motor current is higher than the first threshold value, in a period during which a state where the motor current is higher than the second threshold value is continued.

6. A drive device comprising the overcurrent protection device according to claim 1.

7. A drive device comprising the overcurrent protection device according to claim 2.

8. A drive device comprising the overcurrent protection device according to claim 3.

9. A drive device comprising the overcurrent protection device according to claim 4.

10. A drive device comprising the overcurrent protection device according to claim 5.

* * * * *